(No Model.)
J. C. OSBORNE.
INDICATOR FOR FEED SCREWS OF ENGINE LATHES.
No. 313,612. Patented Mar. 10, 1885.
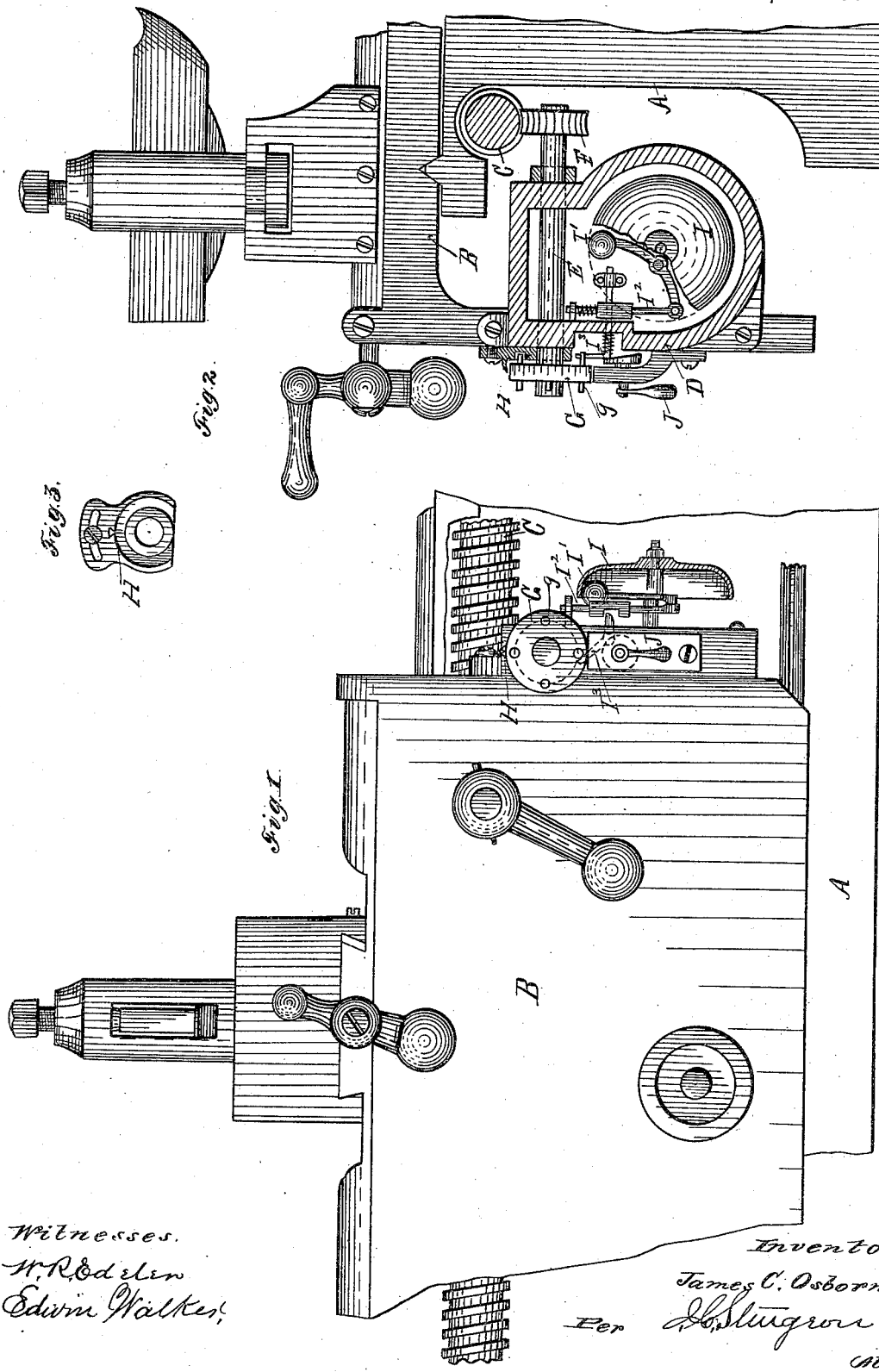
Witnesses.
W. R. Odelin
Edwin Walker
Inventor
James C. Osborne
Per J. G. Sturgeon
Att'y

United States Patent Office.

JAMES C. OSBORNE, OF ERIE, PENNSYLVANIA.

INDICATOR FOR FEED-SCREWS OF ENGINE-LATHES.

SPECIFICATION forming part of Letters Patent No. 313,612, dated March 10, 1885.

Application filed June 21, 1884. (No model.)

*To all whom it may concern:*

Be it known that I, JAMES C. OSBORNE, a citizen of the United States, residing at Erie, in the county of Erie and State of Pennsylvania, have invented certain new and useful Improvements in Screw-Feed Indicators for Engine-Lathes; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in indicators for the screw-cutting mechanism of engine-lathes, and more particularly to attachments on the tool-carriage of screw-cutting engine-lathes, by means of which the tool-carriage can be so adjusted that the cutting-tool will traverse the same track in taking any number of cuts required to finish a screw-thread being turned in said lathe.

The objects of my invention are, first, to attach to the tool-carriage of a lathe mechanism operated by the feed-screw of the lathe, which will indicate the exact point at which the carriage should be started in making a second or any number of subsequent cuts which may be required over the work to finish a thread being cut in such lathe: second, to attach to the tool-carriage of a lathe mechanism containing a worm-wheel operated by the feed-screw of said lathe, said worm-wheel actuating a scale, dial, or pointer, which will indicate the proper point to lock the feed-nut of the tool-carriage in making the second and subsequent cuts over the work required to finish a thread being cut in such lathe; third, to construct in such device a gong-bell actuated by the worm-wheel driven by the feed-screw of a lathe, which by its sound will indicate the exact point for locking the tool-carriage to the feed-screw in making the second and subsequent cuts required in turning a screw-thread in a lathe.

Other features of my invention will hereinafter appear in the specification and claims. I accomplish these objects by the mechanism illustrated in the accompanying drawings, in which—

Figure 1 shows a side elevation of a part of a lathe-bed, the feed-screw thereof, and also a portion of the tool-carriage of a lathe with my improvements attached thereto. Fig. 2 is an end elevation of a portion of a lathe-bed, and the tool-carriage and feed-screw thereof, showing my improvement attached thereto. Fig. 3 shows in elevation an adjustable scale-indicator used in my device detached therefrom.

Like letters indicate like parts in all the figures.

It is well known to those familiar with the art of screw-cutting on lathes that it is difficult or nearly impossible to start the tool after making the first cut over the work in the making of a screw at the exact point necessary to cause the tool to traverse in the first cut made over the work by the previous traverse of the tool. In order to accomplish this lathes are ordinarily provided with a backing mechanism, by which, when the tool has passed over the entire length of the work, it is withdrawn therefrom, and the lathe reversed and run backward until the carriage has traveled back the entire length of the screw being made, when the lathe is again started forward and the tool set into the work, and this operation is repeated with each cut made until the screw is finished. The reason of this difficulty is obvious from the fact that the feed-screw of a lathe is always of a given pitch, while the thread being cut in the lathe may vary and be of almost any given pitch, according to the number of screw-cutting gears with which the lathe is provided. My improvement overcomes this difficulty, and by its use I can entirely dispense with the backing up of the lathe in screw-cutting, and at once set the carriage and tool back to the proper starting-point, as indicated by my device, and take a new cut over the work in the same manner as though I were doing plain turning.

In the construction of my device in the form shown in the drawings, A is a portion of an ordinary lathe-bed. B is the tool-carriage thereof, and C is the feed-screw of said lathe, these parts being common in the construction of engine-lathes.

On the tool-carriage B, I screw or otherwise attach the frame D of my device. In this frame D is mounted the shaft E in such a position that a worm-wheel, F, attached to the inner end thereof, will mesh into and be driven by the feed-screw C of the lathe. Upon the outer end of the shaft E, I place a circular scale, G, the outer edge of which I divide into any number of spaces or degrees. Attached to the frame D is also an adjustable pointer or indicator, H, (shown detached in Fig. 3,) which may be adjusted to any point desired to take up any lost motion or backlash in the lathe. I also attach to the frame D a gong-bell, I, which is operated by means of the hammer I', one arm of which is connected with the sliding lever I², which in turn is connected to the bell-crank lever I³, which bell-crank lever is operated by means of pins $g$ in the scale-disk G, which pins $g$ are inserted into the scale-disk G at such points as threads of different pitch being cut may require. Attached to the front of the frame D, and connecting with the bell-crank lever I³, is also a handle, J, by means of which the bell-crank lever I³ can be thrown out of contact with the pins $g$ in the scale-disk G when the operator does not desire to use the gong part of the device.

The construction of the mechanism operating the gong I is not material, as many modifications thereof can be readily made, the form shown being merely an ordinary and convenient way of ringing a gong, and any ordinary gong-ringing mechanism arranged to be actuated by the worm-wheel F can be used in operating my improvement.

In operating a lathe for screw-cutting provided with my improvement, the tool-carriage is moved to the point where it is desired the cut on the work shall begin. This point is readily noted, as shown by the pointer H on the scale-disk G. The tool being then run over the length of the screw to be cut, it is simply necessary in starting a new cut to move the tool back out of the work, unlock the feed-nut of the tool-carriage from the feed-screw C, and push it back to the point indicated by the pointer H on the circular scale G as the original starting-point of the first cut, where the carriage can again be locked into contact with the feed-screw of the lathe and the tool set into the work, when it will again traverse exactly the path made by it on its first cut over the work, and this operation has simply to be repeated until the requisite number of cuts necessary to finish the screw have been made.

In operating my device, if desired, the scale G may be entirely left off and mechanism attached to the shaft E or worm-wheel F suitable to operate the gong-bell I alone, which may be substituted for the scale and gong mechanism shown and described.

When the gong-bell alone is used, instead of depending upon the inspection of the scale for the point at which the tool-carriage should be locked to the feed-screw and the tool should be inserted into the work, the sound of the gong-bell I can be substituted therefor, and by starting the first cut at the ringing of the gong, the tool can be inserted into the work by locking the tool-carriage B to the feed-screw C at the ringing of the gong in making each subsequent cut over the work, and the same result accomplished as that hereinbefore described as resulting from the inspection of the scale G therefor.

It will readily be seen that the worm-wheel F is in contact with the feed-screw C of the lathe, they operating together as a rack and pinion during the moving of the carriage back to its starting-point, which must in every instance, by the reverse movement of the shaft E, bring the scale G back to the same point it originally stood at in starting the first cut over the work. Likewise, if the scale be dispensed with, the operation of pushing the carriage back to its starting will ring the gong I at exactly the same point in its traverse at which it originally rung as indicating the starting-point of the first cut over the work, thus in all instances fixing an exact starting-point for each traverse of the cutting-tool, without the necessity of backing up the lathe, as my device indicates the exact point at which it is necessary to lock the carriage to the feed-screw in commencing the second and subsequent cuts required to finish the screw being turned in such lathe.

It is obvious to those skilled in the art to which my invention appertains that many modifications both in form and arrangement of the parts of my device could readily be made without departing from the spirit of my invention. I do not, therefore, desire to limit myself to the exact construction shown. Therefore,

What I claim as new, and desire to secure by Letters Patent of the United States, is—

1. In the tool-carriage of an engine-lathe, a worm-wheel intermeshing with the feed-screw of said lathe, in combination with a gong-bell or alarm operated thereby, substantially as and for the purpose set forth.

2. In the tool-carriage of an engine-lathe, a worm-wheel intermeshing with the feed-screw of said lathe, in combination with a scale or indicator, and a gong-bell or alarm operated thereby, substantially as and for the purpose set forth.

3. In the tool-carriage of an engine-lathe, a worm-wheel intermeshing with the feed-screw of said lathe, in combination with a revolving scale operated thereby, and an adjustable indicator for said scale, substantially as and for the purpose set forth.

4. The combination, in an engine-lathe, of the tool-carriage B and the feed-screw C with the worm-wheel F and its shaft E, operating the revolving scale G, and the adjustable pointer H, substantially as and for the purpose set forth.

5. In an engine-lathe, the tool-carriage B, the feed-screw C, the worm-wheel F, mounted on the shaft E, the circular scale G, operated thereby, and pins *g* therein, in operative combination with the gong-bell I, substantially as and for the purpose set forth.

In testimony whereof I affix my signature in presence of two witnesses.

JAMES C. OSBORNE.

Witnesses:
EDWIN WALKER,
WM. P. HAYES.